United States Patent
Xu et al.

(10) Patent No.: US 11,039,138 B1
(45) Date of Patent: Jun. 15, 2021

(54) ADAPTIVE CODING OF PREDICTION MODES USING PROBABILITY DISTRIBUTIONS

(75) Inventors: Yaowu Xu, Santa Clara, CA (US); Paul Gordon Wilkins, Cambridge (GB); James Bankoski, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 1290 days.

(21) Appl. No.: 13/415,299

(22) Filed: Mar. 8, 2012

(51) Int. Cl.
*H04N 7/12* (2006.01)
*H04N 19/122* (2014.01)
(Continued)

(52) U.S. Cl.
CPC .......... *H04N 19/122* (2014.11); *H04N 19/13* (2014.11); *H04N 19/11* (2014.11); *H04N 19/50* (2014.11); *H04N 19/61* (2014.11); *H04N 19/91* (2014.11)

(58) Field of Classification Search
CPC ...... H04N 19/61; H04N 19/176; H04N 19/91; H04N 19/436; H04N 19/11; H04N 19/147; H04N 19/186; H04N 19/593; H04N 19/109; H04N 19/129; H04N 19/159; H04N 19/124; H04N 19/70; H04N 19/105; H04N 19/44; H04N 19/13; H04N 19/117; H04N 19/182; H04N 19/513; H04N 19/174; H04N 19/103; H04N 19/18; H04N 19/395; H04N 19/48; H04N 19/127; H04N 19/17; H04N 19/172; H04N 19/184; H04N 19/52; H04N 19/50; H04N 1/409; H04N 19/154; H04N 19/90; H04N 19/132; H04N 19/625; H03M 7/42; H03M 7/40; H03M 7/4006; H03M 7/00; H03M 7/46; G06T 5/002; G06T 9/005
(Continued)

(56) References Cited

U.S. PATENT DOCUMENTS 4,710,810 A 12/1987 Koga
5,150,209 A 9/1992 Baker et al.
(Continued)

FOREIGN PATENT DOCUMENTS

EP 1351510 10/2003
EP 1768415 3/2007
(Continued)

OTHER PUBLICATIONS

International Preliminary Report of the International Searching Authority for International Application No. ISR/US2013/065870 dated May 28, 2015, 12 pages.
(Continued)

*Primary Examiner* — Francis Geroleo

(57) ABSTRACT

A system, apparatus, and method for encoding and decoding a video image having a plurality of frames is disclosed. Encoding and decoding the video image can include selecting, for a current block, a prediction mode from a plurality of prediction modes; identifying, for the current block, a quantization value; selecting, for the current block, a probability distribution from a plurality of probability distributions based on the identified quantization value using a processor; and entropy encoding the selected prediction mode using the selected probability distribution.

6 Claims, 9 Drawing Sheets

*600*

|    | M1 | M2 | M3 | M4 | M5 | M6  |
|----|----|----|----|----|----|-----|
| Q1 | 17 | 6  | 5  | 2  | 22 | 203 |
| Q2 | 27 | 13 | 13 | 6  | 27 | 170 |
| Q3 | 35 | 17 | 18 | 9  | 26 | 152 |
| Q4 | 45 | 22 | 24 | 12 | 27 | 126 |
| Q5 | 58 | 26 | 29 | 13 | 26 | 104 |
| Q6 | 73 | 33 | 36 | 17 | 20 | 78  |
| Q7 | 88 | 38 | 39 | 19 | 16 | 57  |
| Q8 | 99 | 42 | 43 | 21 | 12 | 39  |

(51) Int. Cl.
*H04N 19/13* (2014.01)
*H04N 19/61* (2014.01)
*H04N 19/50* (2014.01)
*H04N 19/11* (2014.01)
*H04N 19/91* (2014.01)

(58) Field of Classification Search
USPC .......................................................... 375/240
See application file for complete search history.

(56) References Cited

U.S. PATENT DOCUMENTS

| | | | |
|---|---|---|---|
| 5,461,423 A | 10/1995 | Tsukagoshi | |
| 5,650,782 A | 7/1997 | Kim | |
| 5,686,962 A | 11/1997 | Chung et al. | |
| 5,708,473 A | 1/1998 | Mead | |
| 5,767,909 A | 6/1998 | Jung | |
| 5,777,680 A | 7/1998 | Kim | |
| 5,818,536 A | 10/1998 | Morris et al. | |
| 5,886,652 A | 3/1999 | Adachi et al. | |
| 6,125,144 A | 9/2000 | Matsumura et al. | |
| 6,157,326 A | 12/2000 | Van Der Vieuten et al. | |
| 6,212,234 B1 | 4/2001 | Andoh et al. | |
| 6,256,423 B1 | 7/2001 | Krishnamurthy et al. | |
| 6,314,208 B1 | 11/2001 | Konstantinides et al. | |
| 6,414,995 B2 | 7/2002 | Okumura et al. | |
| 6,418,166 B1 | 7/2002 | Wu et al. | |
| 6,434,197 B1 | 8/2002 | Wang et al. | |
| 6,473,463 B2 | 10/2002 | Agarwal | |
| 6,501,860 B1 | 12/2002 | Charrier et al. | |
| 6,522,784 B1 | 2/2003 | Zlotnick | |
| 6,570,924 B1 | 5/2003 | Lynch et al. | |
| 6,661,842 B1 | 12/2003 | Abousleman | |
| 6,661,925 B1 | 12/2003 | Pianykh et al. | |
| 6,856,701 B2 | 2/2005 | Karczewicz et al. | |
| 6,907,079 B2 | 6/2005 | Gomila et al. | |
| 6,917,651 B1 | 7/2005 | Yoo et al. | |
| 6,985,527 B2 | 1/2006 | Gunter et al. | |
| 7,010,032 B1 | 3/2006 | Kikuchi et al. | |
| 7,085,425 B2 | 8/2006 | Christopoulos et al. | |
| 7,116,831 B2 | 10/2006 | Mukerjee et al. | |
| 7,226,150 B2 | 6/2007 | Yoshimura et al. | |
| 7,432,329 B2 | 10/2008 | Haubennestel et al. | |
| 7,496,143 B2 | 2/2009 | Schwrz et al. | |
| 7,565,018 B2 * | 7/2009 | Srinivasan | H03M 7/40 |
| | | | 382/232 |
| 7,599,435 B2 * | 10/2009 | Marpe | H04N 19/176 |
| | | | 375/240.01 |
| 7,843,998 B2 | 11/2010 | Bjontegaard | |
| 7,957,600 B2 * | 6/2011 | Yang | H04N 19/176 |
| | | | 382/232 |
| 8,385,404 B2 * | 2/2013 | Bankoski et al. | 375/240 |
| 8,428,119 B2 * | 4/2013 | Jagmohan | H03M 7/30 |
| | | | 375/240.01 |
| 8,442,334 B2 * | 5/2013 | Drugeon | H04N 19/00733 |
| | | | 382/238 |
| 8,594,189 B1 * | 11/2013 | Bankoski et al. | 375/240.03 |
| 8,638,854 B1 * | 1/2014 | Bankoski et al. | 375/240.14 |
| 8,638,863 B1 * | 1/2014 | Bankoski et al. | 375/240.29 |
| 8,675,726 B2 * | 3/2014 | Zan | H04N 19/147 |
| | | | 375/240 |
| 8,693,547 B2 * | 4/2014 | Bankoski et al. | 375/240.16 |
| 8,767,817 B1 | 7/2014 | Xu et al. | |
| 8,768,064 B2 * | 7/2014 | Iwamoto | G06F 17/30256 |
| | | | 382/190 |
| 8,780,971 B1 * | 7/2014 | Bankoski et al. | 375/240 |
| 8,781,004 B1 * | 7/2014 | Bankoski et al. | 375/240.29 |
| 8,798,131 B1 * | 8/2014 | Bankoski et al. | 375/240 |
| 8,971,652 B2 * | 3/2015 | Drugeon | H04N 19/00733 |
| | | | 382/238 |
| 8,990,217 B2 * | 3/2015 | Jagmohan | H03M 7/3084 |
| | | | 707/741 |
| 9,083,374 B2 * | 7/2015 | Marpe | H03M 7/40 |
| 9,130,585 B2 * | 9/2015 | Marpe | H03M 7/4081 |
| 9,154,809 B2 * | 10/2015 | Kim | H04N 19/105 |
| 9,455,744 B2 * | 9/2016 | George | H04N 19/52 |
| 9,473,170 B2 * | 10/2016 | George | H04N 19/52 |
| 2001/0022815 A1 | 9/2001 | Agarwal | |
| 2002/0009153 A1 | 1/2002 | Jeon et al. | |
| 2002/0036705 A1 | 3/2002 | Lee et al. | |
| 2002/0071485 A1 | 6/2002 | Caglar et al. | |
| 2002/0080871 A1 | 6/2002 | Fallon et al. | |
| 2003/0081850 A1 | 5/2003 | Karczewicz et al. | |
| 2003/0185455 A1 * | 10/2003 | Goertzen | 382/240 |
| 2003/0215018 A1 | 11/2003 | Macinnis et al. | |
| 2004/0013308 A1 | 1/2004 | Jeon et al. | |
| 2004/0120398 A1 | 6/2004 | Zhang et al. | |
| 2004/0131117 A1 | 7/2004 | Sheraizin et al. | |
| 2004/0234144 A1 | 11/2004 | Sugimoto et al. | |
| 2004/0258156 A1 * | 12/2004 | Chujoh | H04N 19/105 |
| | | | 375/240.16 |
| 2005/0152459 A1 | 7/2005 | Lobo et al. | |
| 2005/0180500 A1 | 8/2005 | Chaing et al. | |
| 2005/0192085 A1 * | 9/2005 | Iwamoto | G07F 17/32 |
| | | | 463/20 |
| 2005/0276323 A1 | 12/2005 | Martemyanov et al. | |
| 2006/0001557 A1 | 1/2006 | Liao | |
| 2006/0098738 A1 | 5/2006 | Cosman et al. | |
| 2006/0126724 A1 | 6/2006 | Cote et al. | |
| 2006/0133481 A1 * | 6/2006 | Chujoh | H04N 19/176 |
| | | | 375/240.03 |
| 2006/0203916 A1 | 9/2006 | Chandramouly et al. | |
| 2007/0025441 A1 | 2/2007 | Ugur et al. | |
| 2007/0036443 A1 * | 2/2007 | Srinivasan | H03M 7/40 |
| | | | 382/232 |
| 2007/0127831 A1 | 6/2007 | Venkataraman | |
| 2007/0153901 A1 * | 7/2007 | Chujoh | H04N 19/105 |
| | | | 375/240.16 |
| 2007/0177673 A1 | 8/2007 | Yang | |
| 2007/0200737 A1 * | 8/2007 | Gao | H04N 19/159 |
| | | | 341/50 |
| 2007/0253479 A1 * | 11/2007 | Mukherjee | H04N 19/395 |
| | | | 375/240.1 |
| 2008/0170615 A1 | 7/2008 | Sekiguchi et al. | |
| 2008/0181299 A1 | 7/2008 | Tian et al. | |
| 2008/0240250 A1 | 10/2008 | Lin et al. | |
| 2008/0279466 A1 * | 11/2008 | Yang | H04N 19/176 |
| | | | 382/246 |
| 2008/0310503 A1 | 12/2008 | Lee et al. | |
| 2008/0310504 A1 * | 12/2008 | Ye | H04N 19/197 |
| | | | 375/240.02 |
| 2008/0310507 A1 * | 12/2008 | Ye | H04N 19/18 |
| | | | 375/240.12 |
| 2008/0310512 A1 * | 12/2008 | Ye | H04N 19/197 |
| | | | 375/240.16 |
| 2008/0310745 A1 * | 12/2008 | Ye | H04N 19/61 |
| | | | 382/238 |
| 2009/0003441 A1 * | 1/2009 | Sekiguchi | H04N 19/176 |
| | | | 375/240.13 |
| 2009/0003448 A1 * | 1/2009 | Sekiguchi | H04N 19/176 |
| | | | 375/240.16 |
| 2009/0003449 A1 * | 1/2009 | Sekiguchi | H04N 19/176 |
| | | | 375/240.16 |
| 2009/0034857 A1 * | 2/2009 | Moriya | H04N 19/176 |
| | | | 382/238 |
| 2009/0080532 A1 * | 3/2009 | Marpe | H04N 19/176 |
| | | | 375/240.24 |
| 2009/0123066 A1 * | 5/2009 | Moriya | H04N 19/139 |
| | | | 382/166 |
| 2009/0175334 A1 * | 7/2009 | Ye | H04N 19/46 |
| | | | 375/240.12 |
| 2009/0190659 A1 | 7/2009 | Lee et al. | |
| 2009/0248767 A1 * | 10/2009 | Moriya | G06F 17/18 |
| | | | 708/200 |
| 2009/0316790 A1 * | 12/2009 | Chujoh | H04N 19/105 |
| | | | 375/240.16 |
| 2009/0316791 A1 * | 12/2009 | Chujoh | H04N 19/105 |
| | | | 375/240.16 |
| 2009/0323805 A1 * | 12/2009 | Chujoh | H04N 19/105 |
| | | | 375/240.12 |

(56) References Cited

U.S. PATENT DOCUMENTS

| | | | |
|---|---|---|---|
| 2009/0323806 A1* | 12/2009 | Chujoh | H04N 19/105 375/240.12 |
| 2009/0323816 A1* | 12/2009 | Chujoh | H04N 19/105 375/240.16 |
| 2009/0323817 A1* | 12/2009 | Chujoh | H04N 19/105 375/240.16 |
| 2010/0027625 A1* | 2/2010 | Wik | G10L 19/002 375/240.12 |
| 2010/0054328 A1 | 3/2010 | Nozawa | |
| 2010/0061461 A1* | 3/2010 | Bankoski et al. | 375/240.16 |
| 2010/0097250 A1 | 4/2010 | Demircin et al. | |
| 2010/0098169 A1 | 4/2010 | Budagavi | |
| 2010/0128995 A1* | 5/2010 | Drugeon | H04N 19/00733 382/238 |
| 2010/0166069 A1* | 7/2010 | Goel | 375/240.13 |
| 2010/0195733 A1* | 8/2010 | Yan | H04N 19/139 375/240.16 |
| 2010/0290568 A1 | 11/2010 | Suzuki et al. | |
| 2010/0322306 A1 | 12/2010 | Au et al. | |
| 2011/0002386 A1* | 1/2011 | Zhang | H04N 19/105 375/240.15 |
| 2011/0015933 A1* | 1/2011 | Maeda | G10L 19/0208 704/500 |
| 2011/0026595 A1* | 2/2011 | Yasuda | H04N 19/13 375/240.13 |
| 2011/0080946 A1 | 4/2011 | Li et al. | |
| 2011/0103467 A1* | 5/2011 | Wedi | H04N 19/61 375/240.03 |
| 2011/0158538 A1* | 6/2011 | Iwamoto | G06F 17/30256 382/192 |
| 2011/0170606 A1* | 7/2011 | Zhang | H04N 19/593 375/240.16 |
| 2011/0200101 A1* | 8/2011 | Zan | H04N 19/147 375/240.03 |
| 2011/0243225 A1 | 10/2011 | Min et al. | |
| 2012/0020408 A1 | 1/2012 | Chen et al. | |
| 2012/0027084 A1* | 2/2012 | Zhang | H04N 19/196 375/240.12 |
| 2012/0170647 A1 | 7/2012 | He et al. | |
| 2012/0177109 A1* | 7/2012 | Ye | H04N 19/197 375/240.03 |
| 2012/0201300 A1* | 8/2012 | Kim | H04N 19/105 375/240.12 |
| 2012/0257676 A1* | 10/2012 | Bankoski et al. | 375/240.16 |
| 2012/0257677 A1* | 10/2012 | Bankoski et al. | 375/240.16 |
| 2012/0314760 A1 | 12/2012 | He | |
| 2013/0003839 A1* | 1/2013 | Gao | H04N 19/50 375/240.12 |
| 2013/0003840 A1* | 1/2013 | Gao | H04N 19/50 375/240.12 |
| 2013/0027230 A1* | 1/2013 | Marpe | H03M 7/4006 341/107 |
| 2013/0028326 A1* | 1/2013 | Moriya | H04N 19/176 375/240.16 |
| 2013/0044817 A1* | 2/2013 | Bankoski et al. | 375/240.16 |
| 2013/0077687 A1 | 3/2013 | Wang et al. | |
| 2013/0089134 A1 | 4/2013 | Wang et al. | |
| 2013/0089136 A1* | 4/2013 | Srinivasan | H04N 19/159 375/240.03 |
| 2013/0089152 A1 | 4/2013 | Wang et al. | |
| 2013/0187798 A1* | 7/2013 | Marpe | H03M 7/4081 341/67 |
| 2013/0243087 A1* | 9/2013 | Lee | H04N 19/176 375/240.12 |
| 2013/0243089 A1* | 9/2013 | Lim | H04N 19/176 375/240.12 |
| 2013/0251039 A1* | 9/2013 | Drugeon | H04N 19/00733 375/240.14 |
| 2013/0287104 A1* | 10/2013 | Jeong | H04N 19/00569 375/240.12 |
| 2013/0300591 A1* | 11/2013 | Marpe | H03M 7/40 341/67 |
| 2013/0343465 A1 | 12/2013 | Chen et al. | |
| 2014/0003493 A1 | 1/2014 | Chen et al. | |
| 2014/0023138 A1 | 1/2014 | Chen | |
| 2014/0036998 A1 | 2/2014 | Narroschke et al. | |
| 2014/0092984 A1 | 4/2014 | Fang et al. | |
| 2014/0112387 A1* | 4/2014 | Ye | H04N 19/197 375/240.02 |
| 2014/0140400 A1* | 5/2014 | George | H04N 19/52 375/240.12 |
| 2014/0140406 A1 | 5/2014 | Yu et al. | |
| 2014/0177707 A1* | 6/2014 | George | H04N 19/52 375/240.03 |
| 2014/0198841 A1* | 7/2014 | George | H04N 19/52 375/240.03 |
| 2015/0010056 A1* | 1/2015 | Choi | H04N 19/176 375/240.02 |
| 2015/0071356 A1 | 3/2015 | Kim et al. | |
| 2015/0229924 A1* | 8/2015 | Kim | H04N 19/105 375/240.12 |
| 2015/0270850 A1* | 9/2015 | Marpe | H03M 7/40 341/67 |
| 2016/0360204 A1* | 12/2016 | George | H04N 19/52 |
| 2017/0142416 A1* | 5/2017 | George | H04N 19/52 |
| 2018/0014026 A1* | 1/2018 | Lim | H04N 19/11 |

FOREIGN PATENT DOCUMENTS

| | | |
|---|---|---|
| EP | 2235950 | 10/2010 |
| JP | 61092073 | 5/1986 |
| JP | 2217088 | 8/1990 |
| JP | 2272970 | 11/1990 |
| JP | 8280032 | 10/1996 |
| JP | 09247682 | 9/1997 |
| JP | 11262018 | 9/1999 |
| JP | 11289544 | 10/1999 |
| JP | 11313332 | 11/1999 |
| JP | 11513205 | 11/1999 |
| JP | 2002141806 | 5/2002 |
| JP | 2003046944 | 2/2003 |
| JP | 2003235044 | 8/2003 |
| KR | 100213018 | 8/1999 |
| KR | 20010030916 | 4/2001 |
| WO | WO0150770 | 7/2001 |
| WO | WO03026315 | 3/2003 |

OTHER PUBLICATIONS

Park, Jun Sung, et al., "Selective Intra Prediction Mode Decision for H.264/AVC Encoders", World Academy of Science, Engineering and Technology 13, (2006).

Anonymous: "Study Text of ISO/IEC DIS 23800-2 High EfficiexNCy Video Coding", 102. MPEG Meeting ; Oct. 15, 2012-Oct. 19, 2012; Shanghai; (Motion Picture Expert Group or ISO/IEC JTC1/SC29/WG11) No. N13155, Dec. 25, 2012, all pages.

Anonymous: "Text of ISO/IEC DIS 23800-2 High EfficiexNCy Video Coding", 101. MPEG Meeting ; Jul. 16, 2012-Jul. 20, 2012; Stockholm; (Motion Picture Expert Group or ISO/IEC JTC1/SC29/WG11) No. N12935, Aug. 3, 2012, all pages.

Bross, Benjamin et al.: "High EfficiexNCy Video Coding (HEVC) text specification draft 7,"Joint Collaborative Team on Video Coding(JCT-VC) of ISO/IEC JTC1/SC29/WG11 and ITU-T SG16 WP3, 9th Meeting : Geneva, CH, Apr. 27-May 7, 2012, JCTVC-I1003_d9, 278 pages.

Bross, Benjamin et al.: "High EfficiexNCy Video Coding (HEVC) text specification draft 9,"JCT-VC ,Nov. 8, 2012, Retrieved from the internet: URL: http://phenix.int-evry.fr/jet/doc_end_user/documents/11_Shanghai/wg11/JCTVC-K1003-v10.zip [retrieved on Mar. 7, 2014] all pages.

ISR, "ISR Search Report and Written Opinion of the International Searching Authority" for International Application No. ISR/US2013/065870 (CS41073) dated Apr. 10, 2014, 15 pages.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(56) References Cited

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, an Open Source Video CODEC for the Web". Dated Jul. 11, 2011.
Bankoski et al. "VP8 Data Format and Decoding Guide" Independent Submission. Dated Nov. 2011.
Mozilla, "Introduction to Video Coding".
Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

* cited by examiner

*600*

|    | M1 | M2 | M3 | M4 | M5 | M6  |
|----|----|----|----|----|----|-----|
| Q1 | 17 | 6  | 5  | 2  | 22 | 203 |
| Q2 | 27 | 13 | 13 | 6  | 27 | 170 |
| Q3 | 35 | 17 | 18 | 9  | 26 | 152 |
| Q4 | 45 | 22 | 24 | 12 | 27 | 126 |
| Q5 | 58 | 26 | 29 | 13 | 26 | 104 |
| Q6 | 73 | 33 | 36 | 17 | 20 | 78  |
| Q7 | 88 | 38 | 39 | 19 | 16 | 57  |
| Q8 | 99 | 42 | 43 | 21 | 12 | 39  |

|      | M(1)    | ...      | M(n)    |
|------|---------|----------|---------|
| Q1   | P(1,1)  | P(1,...) | P(1,n)  |
| ...  | P(...,1)| P(...,...)| P(...,n)|
| Q(m) | P(m,n)  | P(m,n)   | P(m,n)  |

*FIG. 7*

ADAPTIVE CODING OF PREDICTION MODES USING PROBABILITY DISTRIBUTIONS

TECHNICAL FIELD

This disclosure relates to video encoding and decoding.

BACKGROUND

Digital video can be used for various applications including, for example, video conferencing, high definition video entertainment, video advertisements, or sharing of user-generated videos. A digital video stream can contain a large amount of data and consume a significant amount of computing and/or communication resources of a computing device for processing, transmission and/or storage of the video data.

SUMMARY

Disclosed herein are embodiments of systems, methods, and apparatuses for encoding and decoding a video signal.

One aspect of the disclosed embodiments is a method for encoding a frame in a video stream, the frame having a plurality of blocks including a current block. The method includes selecting, for the current block, a prediction mode from a plurality of prediction modes; identifying, for the current block, a quantization value; selecting, for the current block, a probability distribution from a plurality of probability distributions based on the identified quantization value using a processor; and entropy encoding the selected prediction mode using the selected probability distribution. Each of the plurality of probability distributions corresponds to a probability of occurrence of each of the plurality of prediction modes.

Another aspect of the disclosed embodiments is a method for encoding a frame in a video stream, the frame having a plurality of blocks including a current block. The method includes selecting, for each of at least some of the blocks in the frame, a prediction mode from a plurality of prediction modes; determining, for each of the plurality of prediction modes, a count based on the frequency of selected prediction modes in the frame; selecting, for the frame, a probability distribution from a plurality of probability distributions based on the counts; entropy encoding, for the current block, the selected prediction mode using the selected probability distribution; and encoding a probability distribution value indicating the selected probability distribution.

Another aspect of the disclosed embodiments is an apparatus for coding a frame in a video stream, the frame having a plurality of blocks. The apparatus includes a memory and at least one processor configured to execute instructions stored in the memory to select, for a current block of the plurality of blocks, a prediction mode from a plurality of prediction modes; identify, for the current block, a quantization value; select, for the current block, a probability distribution from a plurality of probability distributions based on the identified quantization value using a processor; and entropy encode the selected prediction mode using the selected probability distribution.

Another aspect of the disclosed embodiments is an apparatus for coding a frame in a video stream, the frame having a plurality of blocks. The apparatus includes a memory and at least one processor configured to execute instructions stored in the memory to select, for each of at least some of the blocks in the frame, a prediction mode from a plurality of prediction modes; determine, for each of the plurality of prediction modes, a count based on the frequency of selected prediction modes in the frame; select, for the frame, a probability distribution from a plurality of probability distributions based on the counts; entropy encode, for the current block, the selected prediction mode using the selected probability distribution; and encode a probability distribution value indicating the selected probability distribution.

BRIEF DESCRIPTION OF THE DRAWINGS

The various features, advantages and other uses of the present apparatus will become more apparent by referring to the following detailed description and drawings. The description herein makes reference to the accompanying drawings wherein like reference numerals refer to like parts throughout the several views, and wherein:

FIG. 6 is a diagram of an example of probability distributions used in encoding the video stream in accordance with one embodiment of this disclosure;

FIG. 7 is a diagram of another example of probability distributions used in encoding the video stream in accordance with one embodiment of this disclosure;

DETAILED DESCRIPTION

Digital video is used for various purposes including, for example, remote business meetings via video conferencing, high definition video entertainment, video advertisements, and sharing of user-generated videos. Digital video streams can be in formats such as present and future versions of VPx and H.264.

A video stream can include a video sequence having a number of frames. A frame can include a set of blocks, which can contain data corresponding to a pixel group in the frame. A block can be encoded using at least one prediction mode. The prediction mode can be selected from multiple prediction modes.

Intra prediction (also referred to herein as intra-prediction or intra-frame prediction) is a technique used in modern image/video compression schemes. Intra prediction uses pixel values from prior-coded blocks within a same image frame to form a predictor block for a current block. The predictor block is subtracted from the current block; the difference, i.e., a residue block, is then encoded and transmitted to decoders. Image or video codecs may support many different intra prediction modes; each image block can use one of the prediction modes that provide a predictor block that is most similar to the current block to minimize the information to be encoded in the residue. The prediction mode for each block can also be encoded and transmitted, so a decoder can use same prediction mode(s) to form prediction blocks in the decoding and reconstruction process.

In some codecs, intra prediction modes are encoded using a fixed distribution. However, experiments indicate that the distribution of intra prediction modes used in video encoding can change significantly depending on input content and quantization parameters. This disclosure includes systems, methods and apparatuses to adaptively encode intra prediction modes using probability distributions, such as to adaptively encode intra prediction modes using probability distributions dependent on quantization parameters. The probability distribution can be selected from multiple probability distributions by one of the methods described below. For example, the probability distribution can be selected by identifying a quantization value for the block, and using the quantization value to select a probability distribution from multiple probability distributions. The probability distribution can also be selected by comparing the frequency of each prediction mode's occurrences with the probability distributions and selecting the probability distribution that uses the least amount of data to encode the prediction modes. Accordingly, the prediction mode itself can be entropy encoded using a probability distribution. An index value indicative of the selected prediction distribution can also be encoded.

Figure 1:
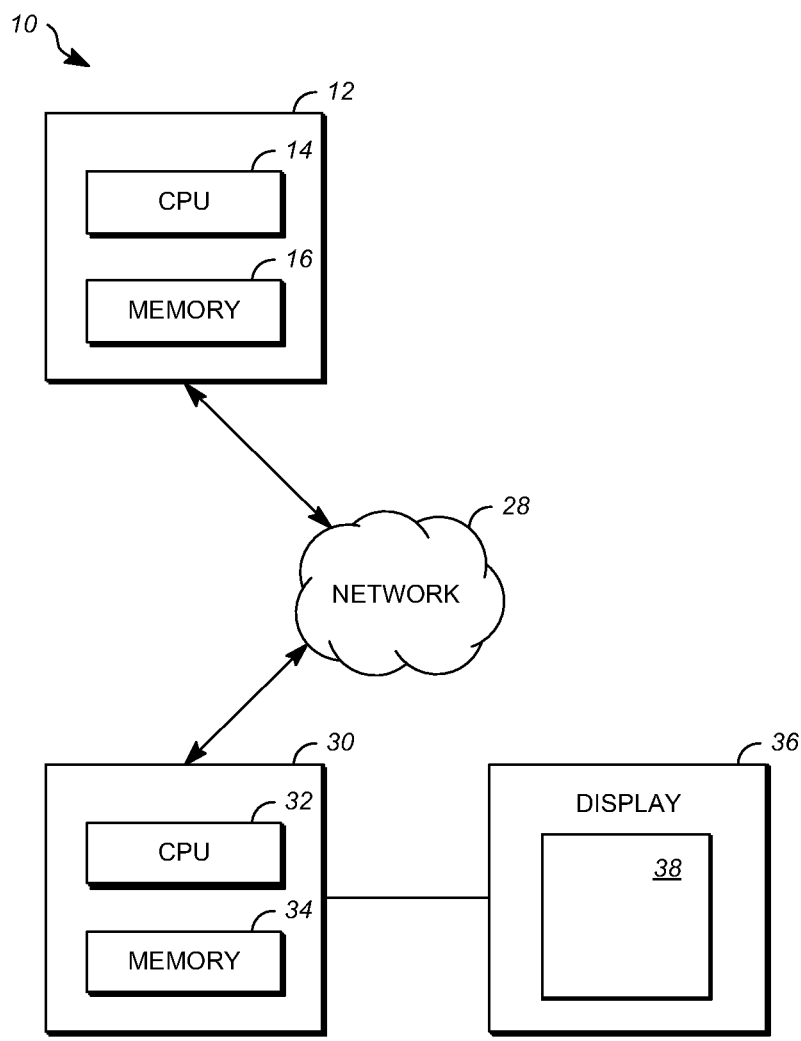
FIG. 1 is a schematic of a video encoding and decoding system.

These and other examples are now described with reference to the accompanying drawings. FIG. 1 is a schematic of a video encoding and decoding system 10. An exemplary transmitting station 12 can be, for example, a computing device having an internal configuration of hardware including a processor such as a central processing unit (CPU) 14 and a memory 16. The CPU 14 can be a controller for controlling the operations of the transmitting station 12. The CPU 14 is connected to the memory 16 by, for example, a memory bus. The memory 16 can be random access memory (RAM) or any other suitable memory device. The memory 16 can store data and program instructions which are used by the CPU 14. Other suitable implementations of the transmitting station 12 are possible. Throughout this disclosure, the term "computing device" includes any device capable of processing information including without limitation: servers, hand-held devices, laptop computers, desktop computers, special purpose computers, and general purpose computers programmed to perform the techniques described herein.

A network 28 connects the transmitting station 12 and a receiving station 30 for encoding and decoding of the video stream. Specifically, the video stream can be encoded in the transmitting station 12 and the encoded video stream can be decoded in the receiving station 30. The network 28 can, for example, be the Internet. The network 28 can also be a local area network (LAN), wide area network (WAN), virtual private network (VPN), a mobile phone network, or any other means of transferring the video stream from the transmitting station 12.

The receiving station 30, in one example, can be a computer having an internal configuration of hardware including a processor such as a central processing unit (CPU) 32 and a memory 34. The CPU 32 is a controller for controlling the operations of the receiving station 30. The CPU 32 can be connected to the memory 34 by, for example, a memory bus. The memory 34 can be RAM or any other suitable memory device. The memory 34 stores data and program instructions which are used by the CPU 32. Other suitable implementations of the receiving station 30 are possible.

A display 36 configured to display a video stream can be connected to the receiving station 30. The display 36 can be implemented in various ways, including by a liquid crystal display (LCD), a light emitting diode display (LED), or a cathode-ray tube (CRT). The display 36 is coupled to CPU 32 and can be configured to display a rendering 38 of a video stream decoded by a decoder at the receiving station 30.

Other implementations of the encoder and decoder system 10 are possible. For example, one implementation can omit the network 28 and/or the display 36. In another implementation, a video stream can be encoded and then stored for transmission at a later time by the receiving station 30 or any other device having memory. In one implementation, the receiving station 30 receives (e.g., via network 28, a computer bus, and/or some communication pathway) the encoded video stream and stores the video stream for later decoding. In another implementation, additional components can be added to the encoder and decoder system 10. For example, a display or a video camera can be attached to the transmitting station 12 to capture the video stream to be encoded.

Figure 2:
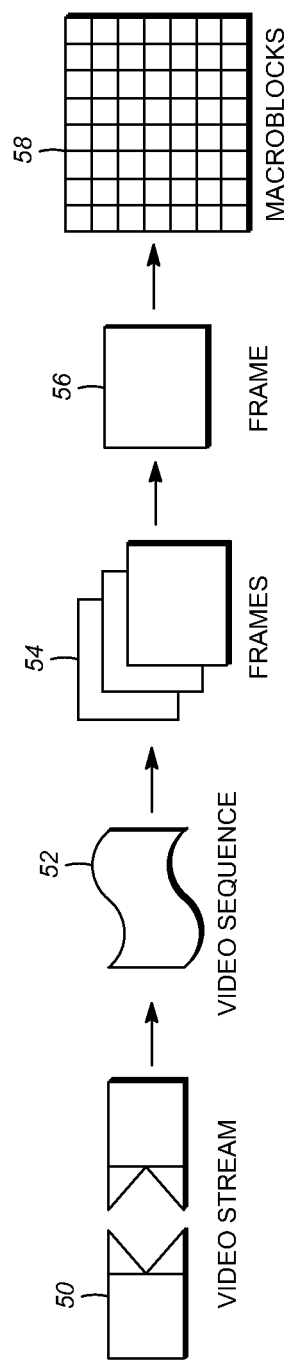
FIG. 2 is a diagram of a typical video stream to be encoded and decoded.

FIG. 2 is a diagram of a typical video stream 50 to be encoded and decoded. The video stream 50 includes a video sequence 52. At the next level, the video sequence 52 includes a number of adjacent frames 54. While three frames are depicted in adjacent frames 54, the video sequence 52 can include any number of adjacent frames. The adjacent frames 54 can then be further subdivided into a single frame 56. At the next level, the single frame 56 can be divided into a set of blocks 58, which can contain data corresponding to, for example, a 16×16 group of pixels in the frame 56. The blocks 58 can also be of any other suitable size such as 16×8 pixel groups or 8×16 pixel groups. Unless otherwise indicated herein, the term 'block' can include a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 3:
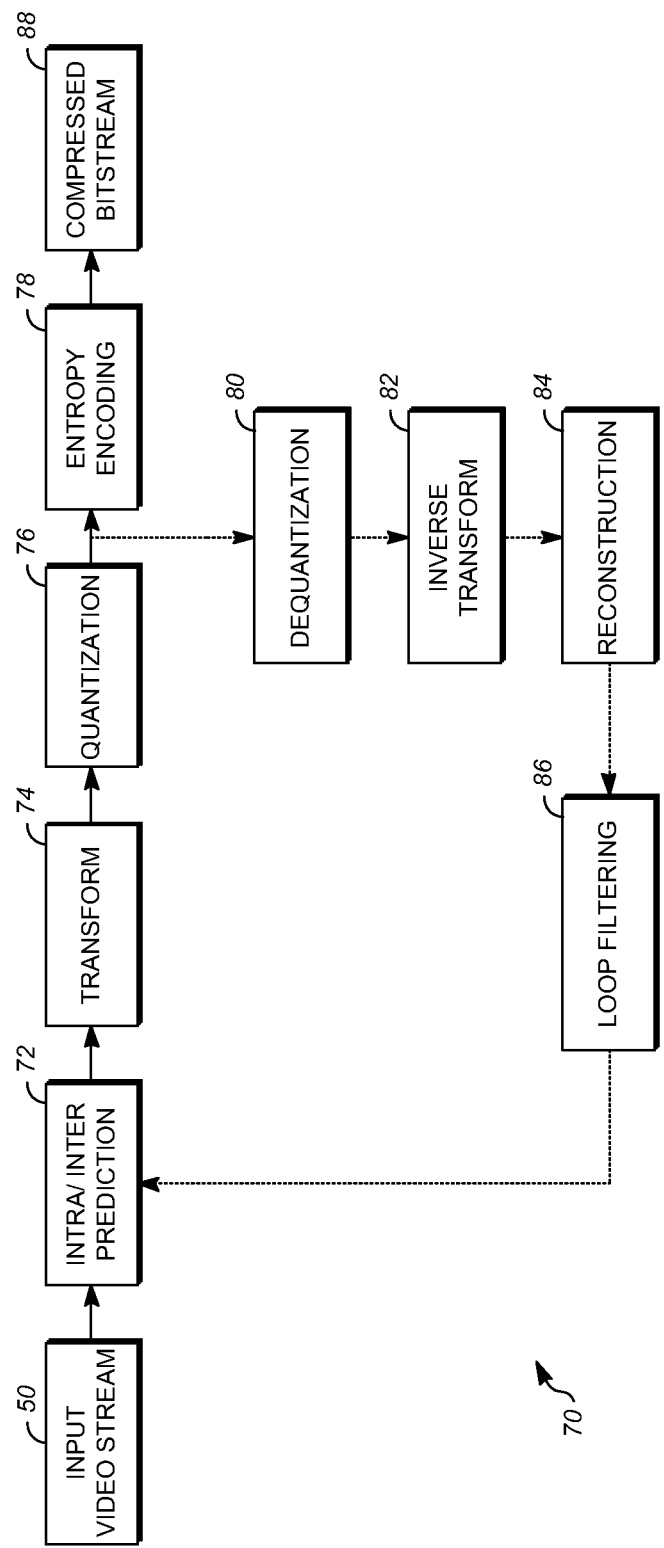
FIG. 3 is a block diagram of a video compression system in accordance with one embodiment.

FIG. 3 is a block diagram of an encoder 70 in accordance with one embodiment. The encoder 70 can be implemented, as described above, in the transmitting station 12 such as by providing a computer software program stored in memory 16, for example. The computer software program can include machine instructions that, when executed by CPU 14, cause transmitting station 12 to encode video data. Encoder 70 can also be implemented as specialized hardware in, for example, transmitting station 12. The encoder 70 encodes an input video stream 50. The encoder 70 has the following stages to perform the various functions in a forward path (shown by the solid connection lines) to produce an encoded or a compressed bitstream 88: an intra/inter prediction stage 72, a transform stage 74, a quantization stage 76, and an entropy encoding stage 78. The encoder 70 also includes a reconstruction path (shown by the dotted connection lines) to reconstruct a frame for encoding of further blocks. The encoder 70 has the following stages to perform the various functions in the reconstruction path: a dequantization stage 80, an inverse transform stage 82, a reconstruction stage 84, and a loop filtering stage 86. Other structural variations of the encoder 70 can be used to encode the video stream 50.

When the video stream 50 is presented for encoding, each frame 56 within the video stream 50 is processed in units of blocks. At the intra/inter prediction stage 72, each block can be encoded using either intra-frame prediction (i.e., within a single frame) or inter-frame prediction (i.e. from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at the intra/inter prediction stage 72 to produce a residual block (residual). The transform stage 74 transforms the residual into transform coefficients in, for example, the frequency domain. Examples of block-based transforms include the Karhunen-Loève Transform (KLT), the Discrete Cosine Transform ("DCT"), and the Singular Value Decomposition Transform ("SVD"). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix.

The quantization stage 76 converts the transform coefficients into discrete quantum values, which are referred to as quantized transform coefficients or quantization levels. The quantized transform coefficients are then entropy encoded by the entropy encoding stage 78. The entropy-encoded coefficients, together with the information used to decode the block, such as the type of prediction used, motion vectors, and quantization value, are then output to the compressed bitstream 88. The compressed bitstream 88 can be formatted using various techniques, such as run-length encoding (RLE) and zero-run coding.

The reconstruction path in FIG. 3 (shown by the dotted connection lines) can be used to provide both the encoder 70 and a decoder 100 (described below) with the same reference frames to decode the compressed bitstream 88. The reconstruction path performs functions that are similar to functions that take place during the decoding process that are discussed in more detail below, including dequantizing the quantized transform coefficients at the dequantization stage 80 and inverse transforming the dequantized transform coefficients at the inverse transform stage 82 to produce a derivative residual block (derivative residual). At the reconstruction stage 84, the prediction block that was predicted at the intra/inter prediction stage 72 can be added to the derivative residual to create a reconstructed block. The loop filtering stage 86 can be applied to the reconstructed block to reduce distortion such as blocking artifacts.

Other variations of the encoder 70 can be used to encode the compressed bitstream 88. For example, a non-transform based encoder 70 can quantize the residual block directly without the transform stage 74. In another embodiment, an encoder 70 can have the quantization stage 76 and the dequantization stage 80 combined into a single stage.

Figure 4:
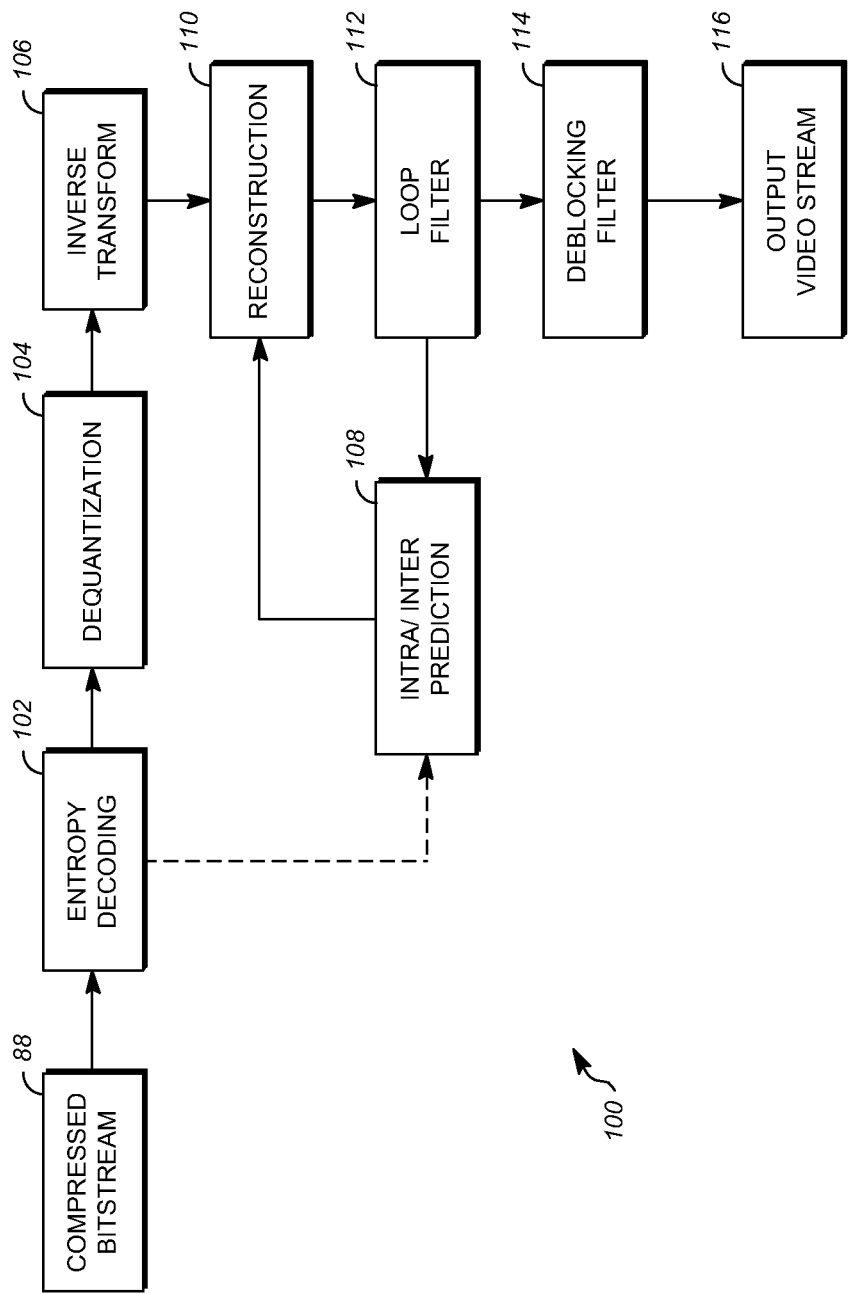
FIG. 4 is a block diagram of a video decompression system in accordance with another embodiment.

FIG. 4 is a block diagram of a decoder 100 in accordance with another embodiment. The decoder 100 can be implemented, for example, in the receiving station 30, such as by providing a computer software program stored in memory for example. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30.

The decoder 100, similar to the reconstruction path of the encoder 70 discussed above, includes in one example the following stages to perform various functions to produce an output video stream 116 from the compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of the decoder 100 can be used to decode the compressed bitstream 88.

When the compressed bitstream 88 is presented for decoding, the data elements within the compressed bitstream 88 can be decoded by the entropy decoding stage 102 (using, for example, Context Adaptive Binary Arithmetic Decoding) to produce a set of quantized transform coefficients. The dequantization stage 104 dequantizes the quantized transform coefficients, and the inverse transform stage 106 inverse transforms the dequantized transform coefficients to produce a derivative residual that can be identical to that created by the reconstruction stage 84 in the encoder 70. Using header information decoded from the compressed bitstream 88, the decoder 100 can use the intra/inter prediction stage 108 to create the same prediction block as was created in the encoder 70. At the reconstruction stage 110, the prediction block can be added to the derivative residual to create a reconstructed block. The loop filtering stage 112 can be applied to the reconstructed block to reduce blocking artifacts. The deblocking filtering stage 114 can be applied to the reconstructed block to reduce blocking distortion, and the result is output as the output video stream 116.

Other variations of the decoder 100 can be used to decode the compressed bitstream 88. For example, the decoder 100 can produce the output video stream 116 without the deblocking filtering stage 114.

Figure 5:
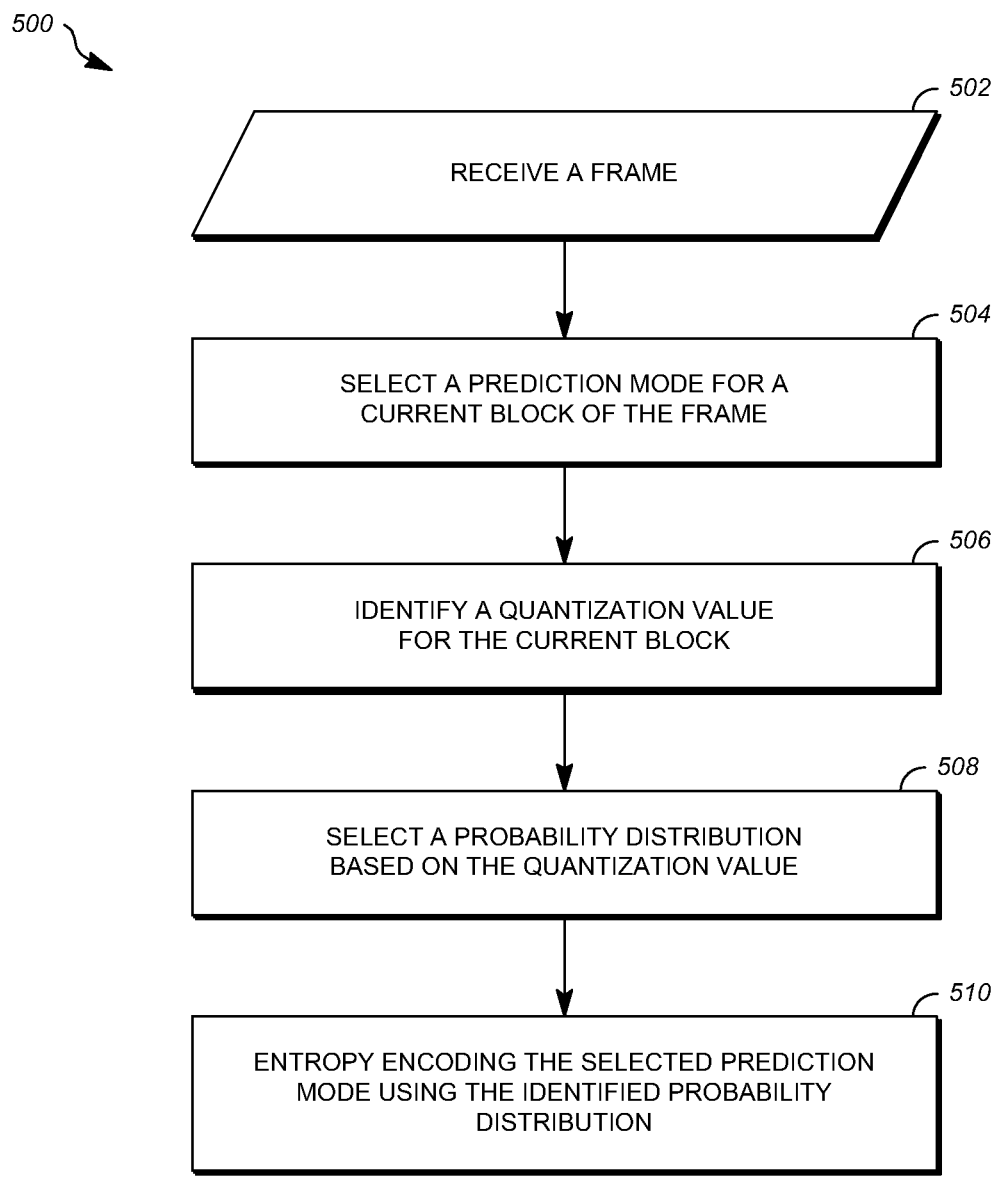
FIG. 5 is a flow diagram of an example method of operation for encoding a video stream in accordance with an embodiment of this disclosure.

FIG. 5 is a flowchart showing an example method of operation 500 for encoding a video stream that can be implemented in an encoder such as encoder 70 in accordance with an embodiment. Method of operation 500 can be implemented, for example, as a software program that is executed by computing devices such as transmitting station 12. For example, the software program can include machine-readable instructions that are stored in a memory such as memory 16 or memory 34, and that when executed by a processor, such as CPU 14, cause the computing device to perform the method of operation 500. Method of operation 500 can also be implemented using specialized hardware. Some computing devices can have multiple memories and/or multiple processors, and the steps of method of operation 500 can, in such instances, be distributed using different processors and/or memories. Use of the terms "processor" and "memory" in the singular encompasses computing devices that have one processor or one memory as well as devices having multiple processors or multiple memories that can each be used in the performance of some but not necessarily all of the recited steps. In some implementations, the transmitting station 12 can be the computing device performing the encoding and/or decoding, and the receiving station 30 can be the computing device performing the decoding. For simplicity of explanation, the method of operation 500 is depicted and described as a series of steps. However, steps in accordance with this disclosure can occur in various orders or concurrently. Furthermore, not all illustrated steps may be required to implement a method in accordance with the disclosed subject matter.

At a step 502, a frame of video data is received by a computing device, such as, for example, transmitting station 30 that is implementing the method of operation 500. The video data (also referred to herein as a video stream) has a plurality of blocks that in some cases can be organized into frames. Each frame can capture a scene with one or more objects, such as people, background elements, graphics, text, a blank wall, or any other information. Video data can be received in any number of ways, such as by receiving the video data over a network, over a cable, or by reading the video data from a primary memory or other storage device, including a disk drive or removable media such as CompactFlash (CF) card, Secure Digital (SD) card, or the like. In one implementation, a block from the plurality of blocks can be a macroblock, which can include, for example, a block of 16×16 pixels, a block of 16×8 pixels, a block of 8×8 pixels, a block of 4×4 pixels, or any other block included in the frame. The pixels can be luminance (luma) pixels or chrominance (chroma) pixels.

In step 504, a prediction mode is selected for a current block of the frame of video data. The current block can be any block in the frame. The selection of prediction mode for the current block can include, for example, determining a prediction mode that minimizes the encoding residual for the current block. The selected prediction mode can be used to encode the current block by using the video data to fill part or all of the pixels in a prediction block for the current block.

The prediction mode can be selected from one of multiple intra prediction modes including, for example, DC prediction mode (which can also be referred to as DC_PRED), horizontal prediction mode (which can also be referred to as H_PRED), vertical prediction mode (which can also be referred to as V_PRED), true motion prediction mode (which can also be referred to as TM_PRED), 8×8 split mode (which can also be referred to as I8X8_PRED) and 4×4 split mode (which can also be referred to as B_PRED). Other intra prediction modes are also possible. In one implementation of DC prediction mode, a single value using the average of the pixels in a row above a current block and a column to the left of the current block can be used to predict the current block. In one implementation of horizontal prediction, each column of a current block can be filled with a copy of a column to the left of the current block. In one implementation of vertical prediction, each row of a current block can be filled with a copy of a row above the current block. In one implementation of TrueMotion prediction, in addition to the row above the current block and the column to the left of the current block, TM_PRED uses the pixel P above and to the left of the block. Horizontal differences between pixels in the row above the current block (starting from P) are propagated using the pixels from the column to the left of the current block to start each row. In one implementation of I8X8_PRED, each 16×16 area is further split into 4 8×8 sub-blocks with each 8×8 having its own prediction mode. In one implementation of B_PRED, each 16×16 area is further split into 16 4×4 sub-blocks with each 4×4 having its own prediction mode. The prediction block is then compared with or subtracted from pixels in the current block to form a residual.

In step 506, a quantization value is identified for the current block. The quantization value can be used in the quantization stage 76 to convert the transform coefficients of the current block into discrete quantum values, which are sometimes referred to as quantized transform coefficients. A frame can have one or more quantization values, which can be applied to the blocks within the frame to reduce the data to be encoded. In some examples, each block or group of blocks can have a quantization value, which may or may not differ from block to block. For example, some blocks can have a higher quantization value than others, which can cause more data reduction at the quantization stage 76 when encoding the block. In another example, one or more quantization values can be associated with all the blocks within the frame. For example, one quantization value can be defined for the frame and stored in the corresponding header information for the frame.

In step 508, a probability distribution is selected from a plurality of probability distributions, based on the quantization value identified in step 506. The probability distributions can be stored in a table, such as a lookup table 600 shown in FIG. 6. In other embodiments, the probability distribution can be selected based on factors other than the quantization value, such as, for example, frequencies of the prediction modes in the frame, as will be described next in the examples shown in FIG. 8-10.

FIG. 6 is a diagram of an example of probability distributions used in encoding the video stream in accordance with one embodiment of this disclosure. The example is shown in a lookup table 600, the columns of which are formed by the prediction modes. In table 600, there are six prediction modes: M1, M2, M3, M4, M5, M6. M1 corresponds to DC prediction mode. M2 corresponds to horizontal prediction mode. M3-M6 correspond to vertical prediction mode, True Motion prediction mode, 8×8 split mode, and 4×4 split mode respectively. Rows of lookup table 600 are formed by quantization parameters, such as eight quantization parameters Q1, Q2, . . . , Q8. Each quantization parameter such as Q1 can be indicative of a range of quantization values. The range can be a predetermined range of values.

Each row in table 600 can correspond to a probability distribution of the prediction modes (such as M1-M6) for the quantization parameter associated with the row. Each probability distribution can correspond to a probability of occurrence of each of the prediction modes for the current block. In some implementations, values of the probability distributions in table 600 can be determined in advance by using empirical data, and can include normalized counts of occurrences of the prediction modes. For example, in some instances, if a block has a higher quantization value, it may be more likely associated with prediction mode such as M1-M4. On the other hand, if a block has a lower quantization value, it may be more likely associated with prediction modes M5 and M6. As one example of this correlation, row Q1 (in this instance a low quantization value) of table 600 has a probability distribution of {17, 6, 5, 2, 22, 203, which shows that there is a probability of 17 occurrences of prediction mode M1, and 6 occurrences of prediction mode M2, among all the possible occurrences (such as, for example, 256 occurrences). These correlations are merely exemplary and other correlations may be derived from empirical data. Probability distributions in table 600 can also be formulated in any other suitable manner. For example, the probability distributions can be selected at random or can be set by a user or programmer.

Each quantization parameter such as Q1 can be indicative of a range of predetermined rang of quantization values. After identifying the quantization value (e.g., at 506), a quantization parameter (e.g., Q1) can be selected from the plurality of quantization parameters (e.g., Q1, Q2, . . . Q8) if the quantization value falls into the range indicated by the quantization parameter. The identified quantization parameter has a corresponding row of probability distribution in table 600. The corresponding probability distribution is then selected. Each quantization parameter such as Q1 can be indicative of a range of quantization values. In the example of FIG. 6, when the quantization value of the current block falls into the range of quantization parameter Q1, the corresponding row having probability distribution of {17, 6, 5, 2, 22, 203} can be selected from table 600. In some examples, the next block to be encoded can have a different quantization value, such as a value that falls into the range of Q2, and the probability distribution of {27, 13, 13, 6, 27, 170} corresponding to Q2 can be selected for the next block.

In other embodiments, the probability distributions can be implemented in other forms or formats. For example, table 600 can include any number of prediction modes or quantization parameters. The quantization parameters can take different ranges of values. Instead of eight distributions, corresponding to the eight different quantization parameters, fewer or more number of distributions may be used, e.g., 4 or 16 different distributions.

FIG. 7 is a diagram of another example of probability distributions used in encoding the video stream in accordance with one embodiment of this disclosure. In FIG. 7, a m×n table 700 can include m rows of quantization parameters and n columns of prediction modes. In table 700, m, n, and the values for the probability distributions can take any value, and not necessarily the same values as in FIG. 6. Also, the rows can represent the prediction modes and the columns can represent the quantization parameters.

Back to FIG. 5, in step 510, the prediction mode selected at 504 is entropy-encoded using the identified probability distribution. The entropy coding can include schemes such as, for example, arithmetic coding. Other suitable schemes are possible (e.g., Huffman coding). The entropy-encoded prediction mode can be stored and/or transmitted with the current block. For example, the entropy-encoded prediction mode can be stored and transmitted in a header associated with the current block.

The encoded video stream can be transmitted, stored, and/or further processed. For example, the encoded video stream can be stored in a memory, such as memory 34 shown in FIG. 1 and transmitted to a decoder, such as decoder 100 shown in FIG. 4.

Figure 8:
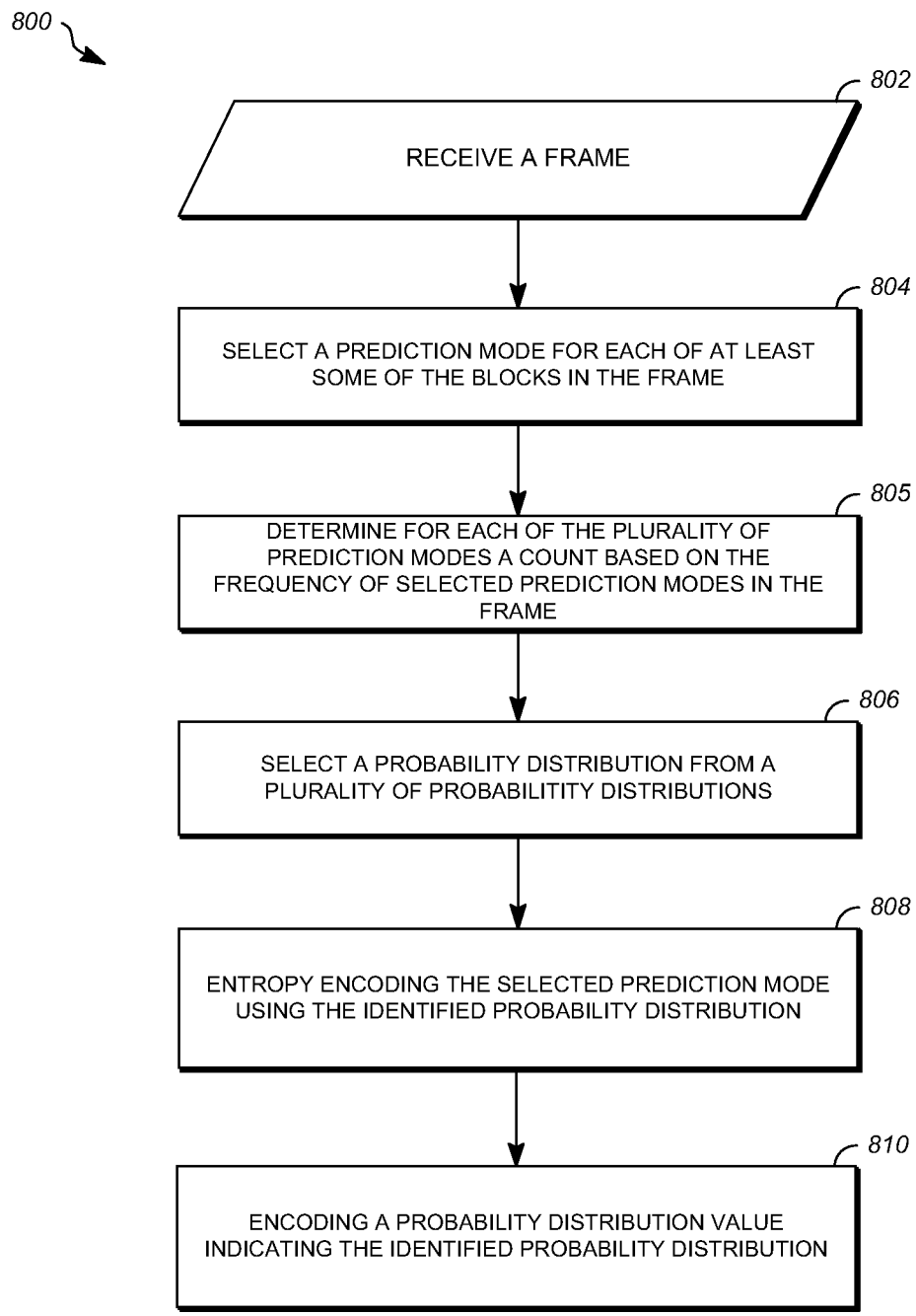
FIG. 8 is a flow diagram of an example method of operation for encoding a video stream in accordance with one embodiment of this disclosure.

FIG. 8 is a flowchart showing an example method of operation 800 for encoding a video stream that can be implemented in an encoder such as encoder 70 in accordance with another embodiment. Method of operation 800 can be implemented, for example, as a software program that is executed by computing devices such as transmitting station 12. For example, the software program can include machine-readable instructions that are stored in a memory such as memory 16 or memory 34, and that when executed by a processor, such as CPU 14, cause the computing device to perform the method of operation 800. Method of operation 800 can also be implemented using specialized hardware. Some computing devices can have multiple memories and/or multiple processors, and the steps of method of operation 800 can in such cases be distributed using different processors and/or memories. Use of the terms "processor" and "memory" in the singular encompasses computing devices that have one processor or one memory as well as devices having multiple processors or memories that can each be used in the performance of some but not necessarily all of the recited steps.

At a step 802, a frame of video data is received by a computing device, such as receiving station 30 that is implementing the method of operation 800. In step 804, a prediction mode is selected for each of at least some of the blocks in the frame, such as a current block of the frame of video data. The current block can be any block of the frame of video data. The prediction mode is selected from one of multiple intra prediction modes such as, for example, DC prediction mode, horizontal prediction mode, vertical prediction mode, true motion prediction mode, 8×8 split mode and 4×4 split mode, as described above. Other intra prediction modes are also possible. The selection of the prediction mode for the current block can include, for example, determining a prediction mode that minimizes the encoding residual for the current block. The selected prediction mode can be used to encode the current block by using video data to fill part or all of the pixels in a prediction block for the current block.

In step 805, a count based on the frequency of selected prediction modes in the frame is determined for each of the plurality of prediction modes. The count based on the frequency for a particular prediction mode can be the number of times the particular prediction mode is selected (e.g., at 804) for the blocks in the frame, collectively. For example, consider a frame that includes 256 blocks. In one example, a first prediction mode is selected for seventy of the blocks; a second prediction mode is selected for thirty of the blocks; a third prediction mode is selected for forty of the blocks; a fourth prediction mode is selected for fifteen of the blocks; a fifth prediction mode is selected for twenty five of the blocks; and a sixth prediction mode is selected for seventy six of the blocks. A count based on the frequency of selected prediction modes can be determined for each of the prediction modes (e.g., first prediction mode, second prediction mode, etc.). The count can correspond to the number of times a particular prediction mode is selected (e.g., seventy, thirty, forty, etc.).

In step 806, a probability distribution is selected for the frame. The probability distribution can be selected from the probability distributions based on the count for each of the prediction modes in step 805. The probability distributions can be stored in a table, such as lookup table 600 as shown in FIGS. 6, 9 and 10 or table 700 as shown in FIG. 7.

Figure 9:
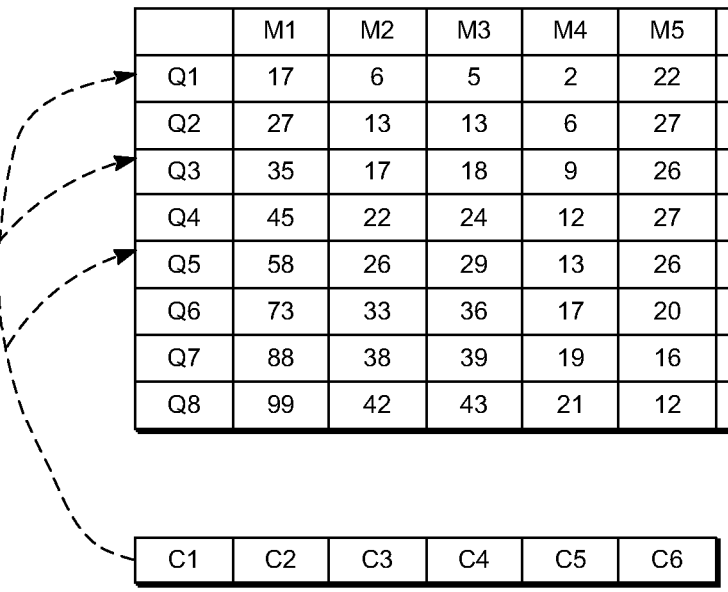
FIGS. 9 and 10 are diagrams of an example of selecting a probability distribution from the probability distributions in FIG. 6 using the example method of operation in FIG. 8 in accordance with one embodiment of this disclosure.
Figure 10:
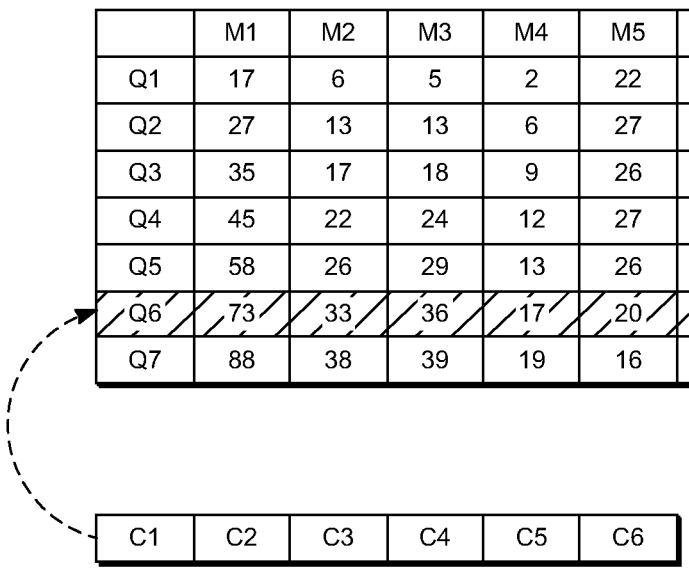

FIGS. 9 and 10 are diagrams of an example of selecting a probability distribution from the probability distributions shown in FIG. 6 using the example method of operation in FIG. 8 in accordance with one embodiment of this disclosure. In the example of FIGS. 9 and 10, counts of the prediction modes used in the frame are shown as {C1, C2, C3, C4, C5, C6}. In one example, the counts of the prediction modes used in the frame can be {70, 30, 40, 15, 25, 70}. Selecting the probability distribution can include, for example, comparing the counts of prediction modes used in the frame with the rows of probability distributions in table 600 (as illustrated in FIG. 9) and identifying the row of probability distribution that requires least amount of data to encode the prediction modes in the frame. In the example above, the selected probability distribution can be, for example, row Q6 ({73, 33, 36, 17, 20, 78}) in table 600, as seen in FIG. 10. The selection of row Q6 over the other rows can be based on, for example, comparing the counts of the prediction modes used in the frame ({70, 30, 40, 15, 25, 70}) with each row (e.g., Q1, Q2, Q3, Q4, Q5, Q6) and identifying that using the probability distribution {73, 33, 36, 17, 20, 78} in Q6 requires the least amount of data to encode the prediction modes in the frame.

An index value indicative of the selected probability distribution can be identified. For example, an index value between 0-7 can be selected from table 600 indicative of which row in table 600 should be used when decoding the prediction modes. The index value can be transmitted in the video stream, and be used by the decoder such as decoder 100 to select a probability distribution from table 600 to decode the prediction modes.

Referring back to FIG. 8, in step 808, the prediction mode selected at 804 is entropy-encoded using the probability distribution selected at 806. The entropy coding can include schemes such as, for example, arithmetic coding. Other schemes can also be used such as, for example, Hoffman coding. The entropy-encoded prediction mode can be stored and/or transmitted in a header associated with the current block.

In step 810, a probability distribution value indicating the identified probability of distribution is encoded. For example, the probability distribution value can be the index value described above. The encoding can include, for example, entropy-encoding the probability distribution value. The encoded probability distribution value can be stored and/or transmitted as part (such as a header) of a compressed bitstream, which the frame is encoded into.

The prediction modes can be intra prediction modes. In some implementations, the plurality of prediction modes can also include other prediction modes such as inter prediction modes.

In some embodiments, some of the prediction modes can be grouped together. For example, prediction modes M1, M2, M3, M4 can be grouped into a single mode "GM0." In these embodiments, a second index can be created to further indicate individual prediction mode such as M1-M4 within the mode GM0.

Figure 11:
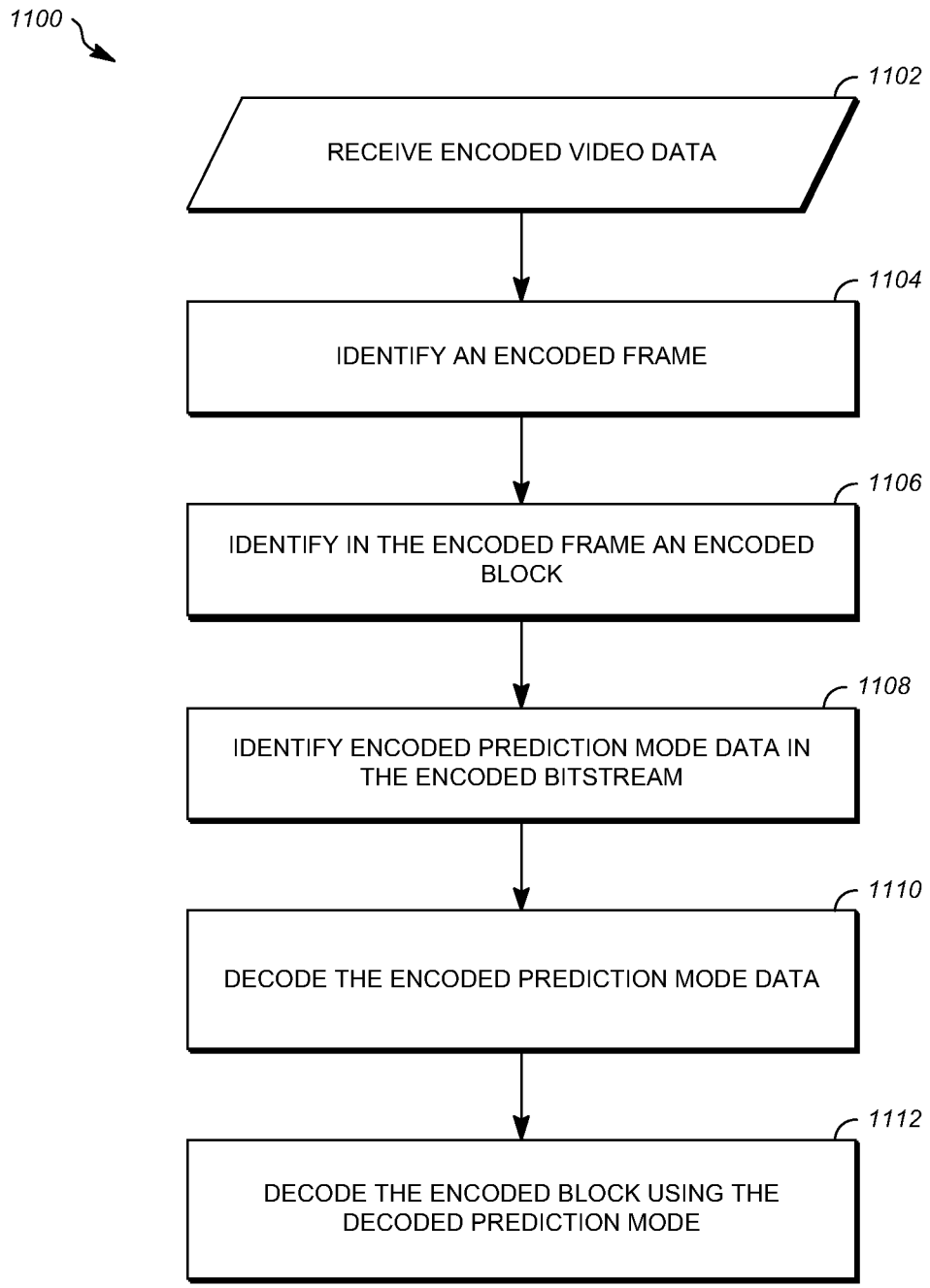
FIG. 11 is a flow diagram of an example method of operation for decoding a video stream in accordance with one embodiment of this disclosure.

FIG. 11 is a flowchart of an example method of operation 1100 that decodes blocks using the encoded video data including the encoded prediction modes in accordance with one embodiment of this disclosure. Method of operation 1100 can be implemented in encoder 70 and/or decoder 100 to decode a video signal. Method of operation 1100 can be implemented, for example, as a software program that is executed by computing devices such as transmitting station 12 or receiving station 30. For example, the software program can include machine-readable instructions that are stored in a memory such as memory 16 or memory 34, and that when executed by a processor, such as CPU 14 or CPU 32, cause the computing device to perform the method of operation 1100. Method of operation 1100 can also be implemented using specialized hardware. As explained above, some computing devices may have multiple memories and/or processors, and the steps of method of operation 1100 can in such cases be distributed using different processors and memories.

At a step 1102, a computing device such as receiving station 30 receives encoded video data, such as compressed bitstream 88. The encoded video data can be received in any number of ways, such as by receiving the video data over a network, over a cable, or by reading the video data from a primary memory or other storage device, including a disk drive or removable media such as a DVD, CompactFlash (CF) card, Secure Digital (SD) card, or the like. At a step 1104, the computing device identifies, in the encoded video data, at least one encoded frame. At a step 1106, the computing device identifies, in the at least one encoded frame, an encoded block.

At a step 1108, the computing device identifies encoded prediction mode data in the encoded bitstream. Identifying the encoded prediction mode data can include, for example, extracting encoded prediction mode data from the bitstream, such as a header or portion of a header associated with a current segment, frame or block. The encoded prediction mode data can include, for example, the prediction mode selected for encoding of the current block, such as intra coding. The encoded prediction mode data can also include, for example, a probability distribution value such as an index value indicative of the probability distribution used for encoding the prediction mode data. The encoded prediction mode data can also include, for example, a quantization value for the current block.

At a step 1110, the computing device decodes the encoded prediction mode data. In one embodiment, the computing device can use, for example, the quantization value identified at step 1108 to identify a probability distribution corresponding to the quantization parameter from a plurality of probability distributions. The quantization value can be the quantization value identified at step 506 when encoding the video data. The quantization parameter can be selected by examining into which range of values the quantization value falls. The probability distribution can be selected from the plurality of probability distributions at the decoder 100. In one embodiment, the computing device can use, for example, the probability distribution value identified at step 1108 to select the probability distribution from the plurality of probability distributions. The probability distribution value can be the probability distribution value used to indicate the probability distribution at the encoding stage in FIG. 8. The plurality of probability distributions can be stored and/or accessed in a table such as a probability distribution table, or a matrix. The table can be a copy of, for example, table 600. Table 600 can be transmitted from, for example, encoder 70. The table 600 can also be predetermined and/or stored at the decoder 100. The table for decoding the prediction mode can contain the same probability distribution values as those used in encoding the video data.

At a step 1112, the computing device decodes the identified encoded block using the decoded prediction mode data. A decoded video stream, such as the output video stream 116 shown in FIG. 4, can be generated. The decoded video stream can be formed by frames, including the frame that includes the decoded block generated at step 1112. The decoded video stream can be stored, further processed, or both stored and further processed. For example, the decoded video stream can be filtered, stored in a memory, such as the memory 34 shown in FIG. 1, and/or displayed at a display, such as the display 36 shown in FIG. 1.

The embodiments or implementations of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

A computing device implementing the techniques disclosed herein (and the algorithms, methods, instructions, etc. stored thereon and/or executed thereby) can be realized in hardware, software, or any combination thereof including, for example, IP cores, ASICS, programmable logic arrays, optical processors, programmable logic controllers, microcode, microcontrollers, servers, microprocessors, digital signal processors or any other suitable circuit or other information processing device, now existing or hereafter developed. In the claims, the term "processor" should be understood as encompassing any of the foregoing hardware, either singly or in combination. The terms "signal" and "data" are used interchangeably.

Further, in some implementations, for example, the techniques described herein can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

In some implementations, the transmitting station 12 and receiving station 30 can, for example, be implemented on computers in a screencasting system. Alternatively, the transmitting station 12 can be implemented on a server and the receiving station 30 can be implemented on a device separate from the server, such as a hand-held communications device (i.e. a cell phone). In this instance, the transmitting station 12 can encode content using an encoder 70 into an encoded video signal and transmit the encoded video signal to the communications device. In turn, the communications device can then decode the encoded video signal using a decoder 100. Alternatively, the communications device can decode content stored locally on the communications device, i.e. content that was not transmitted by the transmitting station 12. Other suitable transmitting station 12 and receiving station 30 implementation schemes are available. For example, the receiving station 30 can be a generally stationary personal computer rather than a portable communications device and/or a device including an encoder 70 may also include a decoder 100.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

Other implementations or embodiments are within the scope of the following claims.

What is claimed is:

1. A method comprising:
generating, by a processor in response to instructions stored on a non-transitory computer readable medium, an encoded block by encoding a current block from a current frame from an input video stream, wherein encoding includes:
generating a prediction block for the current block using a prediction mode;
generating a residual block based on a difference between the current block and the prediction block;
generating transform coefficients by transforming the residual block;
generating quantized transform coefficients by quantizing the transform coefficients using a quantization value;
entropy encoding the quantized transform coefficients;
identifying a probability distribution from a plurality of probability distributions based on the quantization value; and
entropy encoding the prediction mode using the probability distribution.

2. The method of claim 1, wherein identifying the probability distribution includes:
identifying an index value from a plurality of index values, the index value corresponding to a quantization range that includes the quantization value; and
identifying the probability distribution based on the index value.

3. The method of claim 2, wherein the plurality of index values includes eight index values.

4. An apparatus comprising:
a non-transitory computer readable memory; and
a processor configured to execute instructions stored in the memory to:
generate an encoded block by encoding a current block from a current frame from an input video stream by:
generating a prediction block for the current block using a prediction mode;
generating a residual block based on a difference between the current block and the prediction block;
generating transform coefficients by transforming the residual block;
generating quantized transform coefficients by quantizing the transform coefficients using a quantization value;
entropy encoding the quantized transform coefficients;
identifying a probability distribution from a plurality of probability distributions based on the quantization value; and
entropy encode the prediction mode using the probability distribution.

5. The apparatus of claim 4, wherein the processor is configured to execute the instructions to:
identify an index value from a plurality of index values, the index value corresponding to a quantization range that includes the quantization value; and
identify the probability distribution based on the index value.

6. The apparatus of claim 5, wherein the plurality of index values includes eight index values.

* * * * *